United States Patent
Wang et al.

(10) Patent No.: US 8,097,812 B2
(45) Date of Patent: Jan. 17, 2012

(54) FLEXIBLE PIXEL ARRAY SUBSTRATE AND FLEXIBLE DISPLAY

(75) Inventors: Tzu-Ming Wang, Hsinchu (TW); Ted-Hong Shinn, Hsinchu (TW); Po-Wen Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 334 days.

(21) Appl. No.: 12/408,040

(22) Filed: Mar. 20, 2009

(65) Prior Publication Data
US 2010/0200278 A1  Aug. 12, 2010

(30) Foreign Application Priority Data
Feb. 10, 2009 (TW) .............................. 98104167 A (51) Int. Cl.
*H05K 1/00* (2006.01)
*G09G 3/28* (2006.01)

(52) U.S. Cl. ........................................ 174/254; 345/60

(58) Field of Classification Search .................... 174/254
See application file for complete search history.

(56) References Cited

U.S. PATENT DOCUMENTS

| | | | |
|---|---|---|---|
| 4,965,565 A * | 10/1990 | Noguchi | 345/93 |
| 7,221,012 B2 * | 5/2007 | Chu et al. | 257/291 |
| 2003/0189559 A1 * | 10/2003 | Lee et al. | 345/204 |
| 2007/0114530 A1 * | 5/2007 | Kimura | 257/59 |
| 2007/0229417 A1 | 10/2007 | Giraldo et al. | |

FOREIGN PATENT DOCUMENTS

CN  1550854 A  12/2004

* cited by examiner

*Primary Examiner* — Timothy Thompson
*Assistant Examiner* — Roshn Varghese
(74) *Attorney, Agent, or Firm* — Chun-Ming Shih (57) ABSTRACT

A flexible pixel array substrate includes a flexible base, at least one first driving transistor, at least one second driving transistor and at least one pixel electrode. The first driving transistor is disposed on the flexible base and has a first current channel. The second driving transistor is disposed on the flexible base and has a second current channel. The first current channel is not parallel to the second current channel. The pixel electrode is disposed on the flexible base. The pixel electrode is electrically connected to first driving transistor. The pixel electrode is electrically connected to the second driving transistor. In addition, a flexible display applying the flexible pixel array substrate is also provided. Besides, another flexible pixel array substrate and another flexible display applying the same are also provided.

8 Claims, 6 Drawing Sheets

FLEXIBLE PIXEL ARRAY SUBSTRATE AND FLEXIBLE DISPLAY

This US application claims priority to a Taiwan application No. 098104167 filed on Feb. 10, 2009.

BACKGROUND

1. Field of the Invention

The present invention generally relates to a pixel array substrate and a display applying the pixel array substrate, and more specifically, to a flexible pixel array substrate and a flexible display applying the flexible pixel array substrate.

2. Description of the Related Art

Display products are continuously developed to replace the old products in the market, and particularly flexible displays gradually attract more attention. Due to the properties of light weight, thinness and portability, flexible displays have gradually become mainstream products. In addition, the flexible display not only have the property of flexibility, but also have advantages of non-brittleness and impact resistant.

However, when the flexible display is bent, the electrical performances of the driving transistors in the flexible display are adversely affected. Therefore, the image quality of the flexible display is more likely adversely affected. The above problem is worth striving to solve.

BRIEF SUMMARY

The present invention is directed to provide a flexible pixel array substrate which can be applied in a flexible display, so that the image quality of the flexible display can be still maintained in an acceptable state when the flexible display is bent.

The present invention is also directed to provide a flexible display of which the image quality can be still maintained in an acceptable state when it is bent.

The present invention provides a flexible pixel array substrate including a flexible base, at least one first driving transistor, at least one second driving transistor and at least one pixel electrode. The first driving transistor is disposed on the flexible base and has a first current channel. The second driving transistor is disposed on the flexible base and has a second current channel. The first current channel is not parallel to the second current channel. The pixel electrode is disposed on the flexible base. The pixel electrode is electrically connected to first driving transistor. The pixel electrode is electrically connected to the second driving transistor.

In one embodiment of the present invention, the flexible pixel array substrate further includes at least one first scan line, at least one second scan line and at least one data line. The first scan line is disposed on the flexible base. The second scan line is disposed on the flexible base. The data line is disposed on the flexible base. The pixel electrode is electrically connected to the first scan line and the data line via the first driving transistor, and the pixel electrode is electrically connected to the second scan line and the data line via the second driving transistor.

The present invention provides a flexible pixel array substrate including a flexible base, at least one first driving transistor, at least one first pixel electrode, at least one second driving transistor and at least one second pixel electrode. The first driving transistor is disposed on the flexible base and has a first current channel. The first pixel electrode is disposed on the flexible base and the first pixel electrode is electrically connected to the first driving transistor. The second driving transistor is disposed on the flexible base and has a second current channel. The first current channel is not parallel to the second current channel. The second pixel electrode is disposed on the flexible base and the second pixel electrode is electrically connected to the second driving transistor.

In one embodiment of the present invention, the flexible pixel array substrate further includes at least one first scan line, at least one second scan line and at least one data line. The first scan line is disposed on the flexible base. The second scan line is disposed on the flexible base. The data line is disposed on the flexible base. The first pixel electrode is electrically connected to the first scan line and the data line via the first driving transistor, and the second pixel electrode is electrically connected to the second scan line and the data line via the second driving transistor.

The present invention provides a flexible display including a flexible pixel array substrate, a display layer and a common electrode. The flexible pixel array substrate includes a flexible base, at least one first driving transistor, at least one second driving transistor and at least one pixel electrode. The first driving transistor is disposed on the flexible base and has a first current channel. The second driving transistor is disposed on the flexible base and has a second current channel. The first current channel is not parallel to the second current channel. The pixel electrode is disposed on the flexible base. The pixel electrode is electrically connected to the first driving transistor, and the pixel electrode is electrically connected to the second driving transistor. The display layer is disposed on the flexible pixel array substrate. The common electrode is disposed on the display layer.

In one embodiment of the present invention, the flexible pixel array substrate further include at least one first scan line, at least one second scan line and at least one data line. The first scan line is disposed on the flexible base. The second scan line is disposed on the flexible base. The data line is disposed on the flexible base. The pixel electrode is electrically connected to the first scan line and the data line via the first driving transistor, and the pixel electrode is electrically connected to the second scan line and the data line via the second driving transistor.

The present invention provides a flexible display including a flexible pixel array substrate, a display layer and a common electrode. The flexible pixel array substrate includes a flexible base, at least one first driving transistor, at least one first pixel electrode, at least one second driving transistor and at least one second pixel electrode. The first driving transistor is disposed on the flexible base and has a first current channel. The first pixel electrode is disposed on the flexible base. The first pixel electrode is electrically connected to the first driving transistor. The second driving transistor is disposed on the flexible base and has a second current channel. The first current channel is not parallel to the second current channel. The second pixel electrode is disposed on the flexible base. The second pixel electrode is electrically connected to the second driving transistor. The display layer is disposed on the flexible pixel array substrate. The common electrode is disposed on the display layer.

In one embodiment of the present invention, the flexible pixel array substrate further include at least one first scan line, at least one second scan line and at least one data line. The first scan line is disposed on the flexible base. The second scan line is disposed on the flexible base. The data line is disposed on the flexible base. The first pixel electrode is electrically connected to the first scan line and the data line via the first driving transistor, and the second pixel electrode is electrically connected to the second scan line and the data line via the second driving transistor.

When the flexible display applying the flexible pixel array substrate of the embodiment of the present invention is bent, the driving transistor of which the current flow in the current channel is increased drives the corresponding pixel electrode. Therefore, the image quality of the flexible display which is bent is still maintained in an acceptable state.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present display method, in detail. The following description is given by way of example, and not limitation.

First Embodiment

Figure 1:
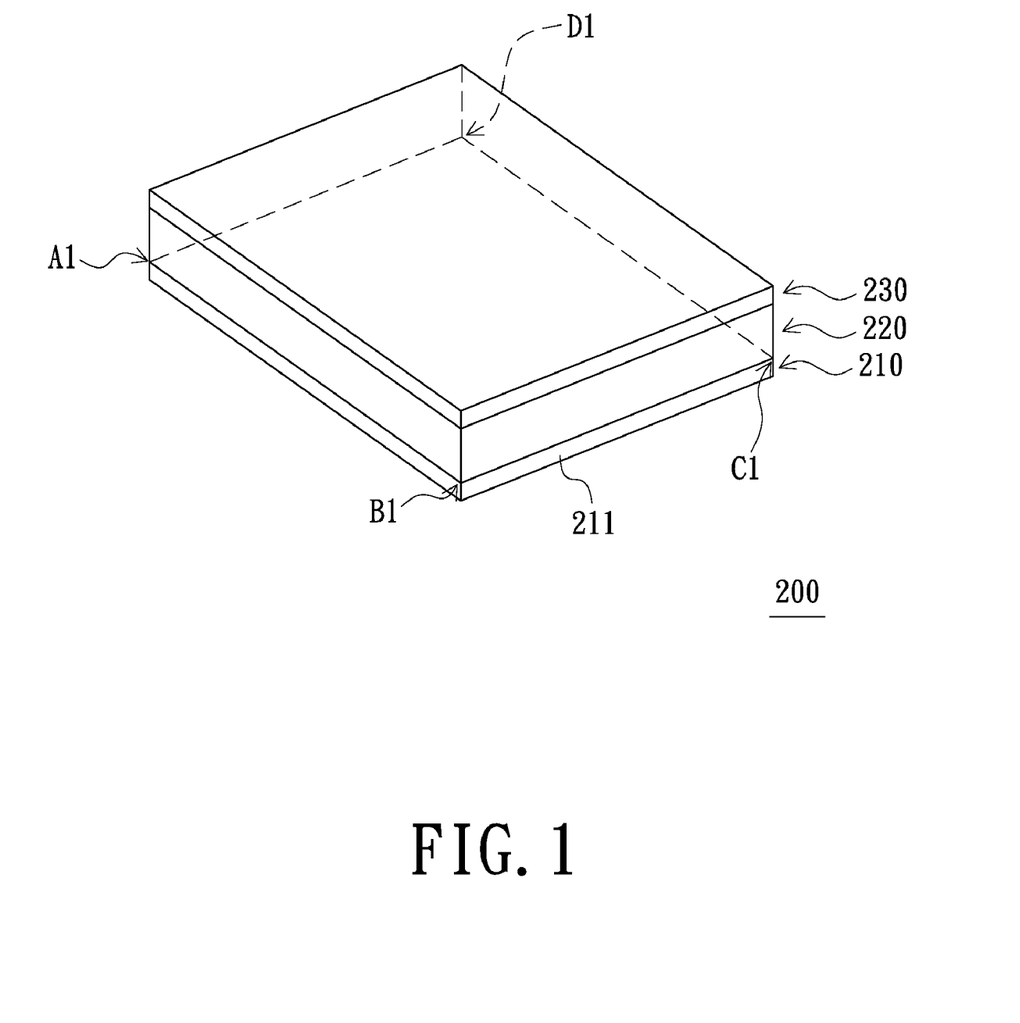
FIG. 1 is a schematic three-dimensional view of a flexible display according to a first embodiment of the present invention.
Figure 2:
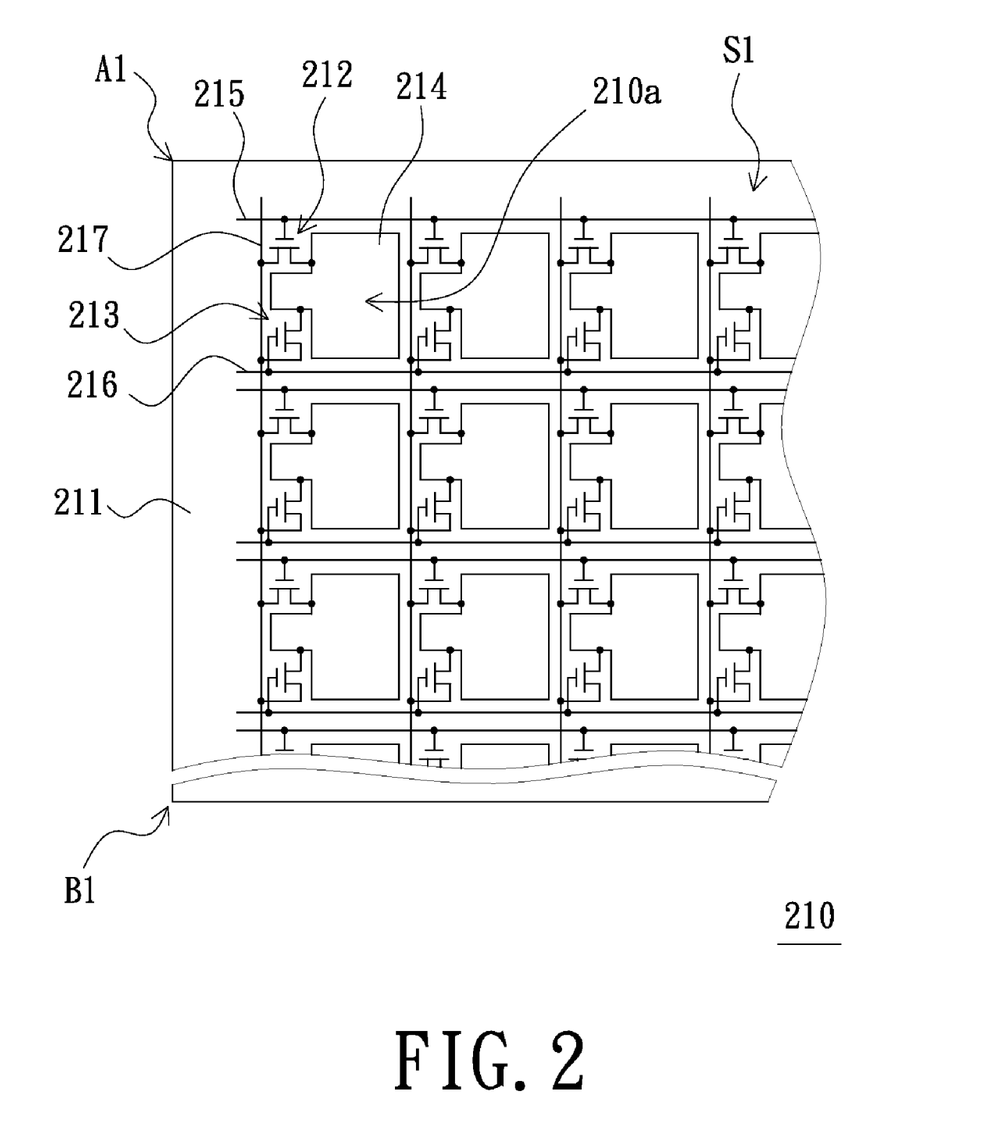
FIG. 2 is a schematic top view of a flexible pixel array substrate of FIG. 1.
Figure 3:
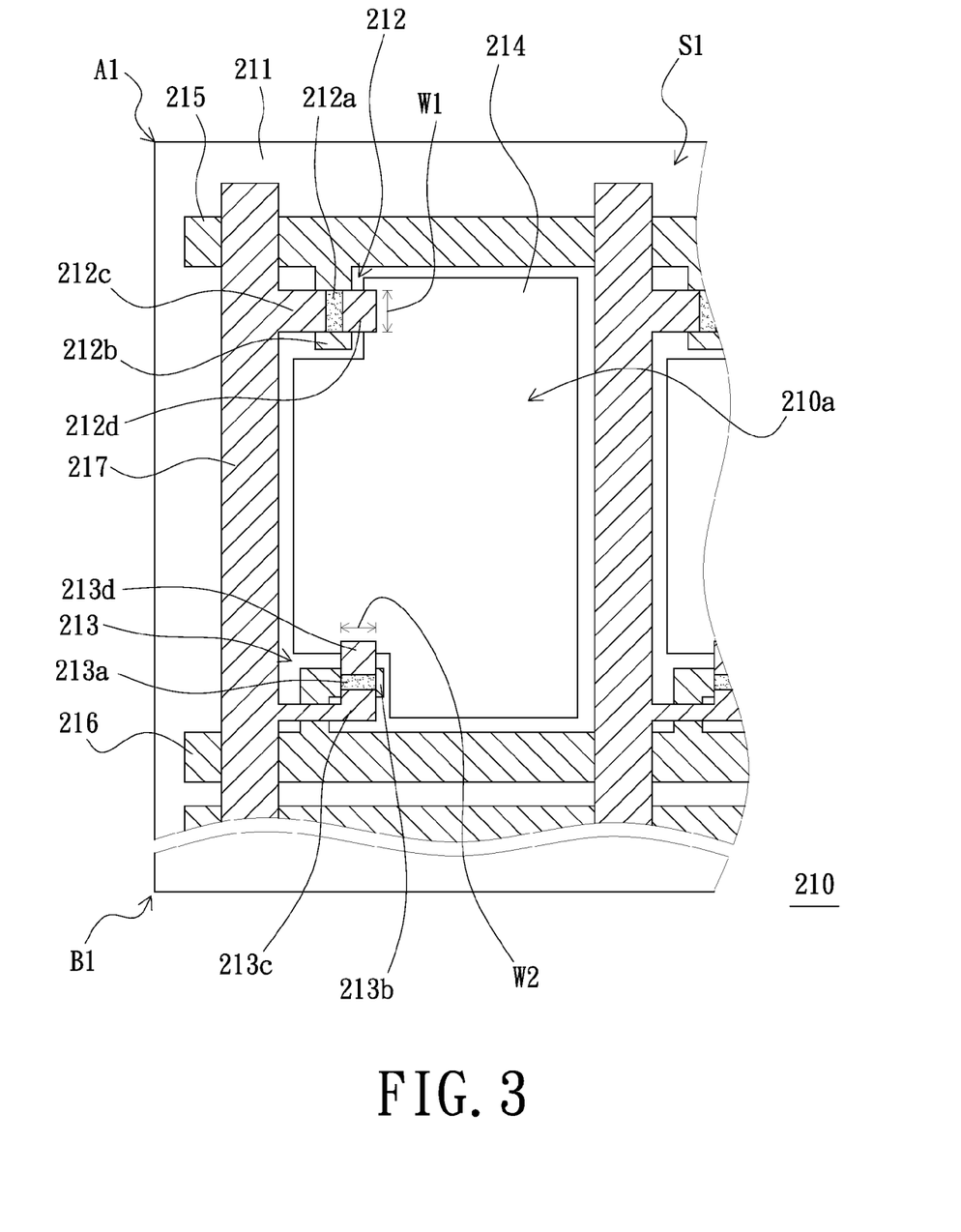
FIG. 3 is a schematic top view of the structure of one of pixel units of FIG. 2.

FIG. 1 is a schematic three-dimensional view of a flexible display according to a first embodiment of the present invention. FIG. 2 is a schematic top view of a flexible pixel array substrate of FIG. 1. FIG. 3 is a schematic top view of the structure of one of pixel units of FIG. 2. It should be noted that, some components of the flexible pixel array substrate 210 of FIG. 1 is omitted for clarity. Referring to FIGS. 1-3, a flexible display 200 of this embodiment includes a flexible pixel array substrate 210, a display layer 220 and a common electrode 230. The display layer 220 is disposed on the flexible pixel array substrate 210. The display layer 220 of this embodiment, for example, is an electrophoresis layer which has a plurality of microcapsules (not shown) and electrophoretic fluid (not shown) filling each of the microcapsules. The electrophoretic fluid in each of the microcapsules includes a dielectric liquid and a plurality of electrophoretic particles dispersed in the dielectric liquid. In addition, the microcapsules of this embodiment can be replaced by a plurality of microcups. The scope of the present invention is not limited herein.

The common electrode 230 is disposed on the display layer 220. The common electrode 230 is a transparent conductive film made of indium-Tin-Oxide (ITO), for example. The flexible pixel array substrate 210 includes a flexible base 211, a plurality of first driving transistors 212, a plurality of second driving transistors 213, a plurality of pixel electrodes 214 which are arranged in an array, a plurality of first scan lines 215, a plurality of second scan lines 216 and a plurality of data lines 217. The flexible base 211 may be a cuboid and includes a surface S1. The surface S1 of the flexible base 211 includes corners A1, B1, C1 and D1. The display layer 220 is disposed on the surface S1 of the flexible base 211. In addition, the material of the flexible base 211 may be plastic, for example.

The flexible pixel array substrate 210 has a plurality of pixel units 210a. Each of the pixel units 210a is composed of one of the pixel electrodes 214, the corresponding first driving transistor 212, the corresponding second driving transistor 213, one part of the corresponding data line 217, and one part of the corresponding first scan line 215 and one part of the corresponding second scan line 216, wherein the corresponding first scan line 215 and the corresponding second scan line 216 are located at opposite sides of the said pixel electrode 214. It should be note that, for convenience of illustration, one of the pixel units 210a is described in detail in the following text.

Referring to the pixel unit 210a marked in FIGS. 2-3, the first driving transistor 212 is disposed on the surface S1 of the flexible base 211 and has a first current channel 212a. The first current channel 212a has a first width W1, and the direction of the current flow in the first current channel 212a can be regarded as perpendicular to the first width W1. The first driving transistor 212 may be a thin film transistor (TFT). The second driving transistor 213 is disposed on the surface S1 of the flexible base 211 and has a second current channel 213a. The second current channel 213a has a second width W2, and the direction of the current flow in the second current channel 213a can be regarded as perpendicular to the second width W2. The second driving transistor 213 may be a TFT, and the first current channel 212a is not parallel to the second current channel 213a. In this embodiment, the first current channel 212a is perpendicular to the second current channel 213a. In other words, the direction of current flow in the first current channel 212a is perpendicular to the direction of current flow in the second current channel 213a.

The pixel electrode 214, the first scan line 215, the second scan line 216 and the data line 217 are disposed on the surface S1 of the flexible base 211. In this embodiment, the first scan line 215 is parallel to the second scan line 216, and the data line 217 is perpendicular to the first scan line 215. The first scan line 215 and the second scan line 216 are located at opposite sides of the pixel electrode 214. The pixel electrode 214 is electrically connected to the first scan line 215 and the data line 217 via the first driving transistor 212. The pixel electrode 214 is electrically connected to the second scan line 216 and the data line 217 via the second driving transistor 213.

Concretely speaking, the gate 212b of the first driving transistor 212 is electrically connected to the first scan line 215. The source 212c of the first driving transistor 212 is electrically connected to the data line 217. The drain 212d of the first driving transistor 212 is electrically connected to the pixel electrode 214. In addition, the gate 213b of the second driving transistor 213 is electrically connected to the second scan line 216. The source 213c of the second driving transistor 213 is electrically connected to the data line 217. The drain 213d of the second driving transistor 213 is electrically connected to the pixel electrode 214.

Figure 4:
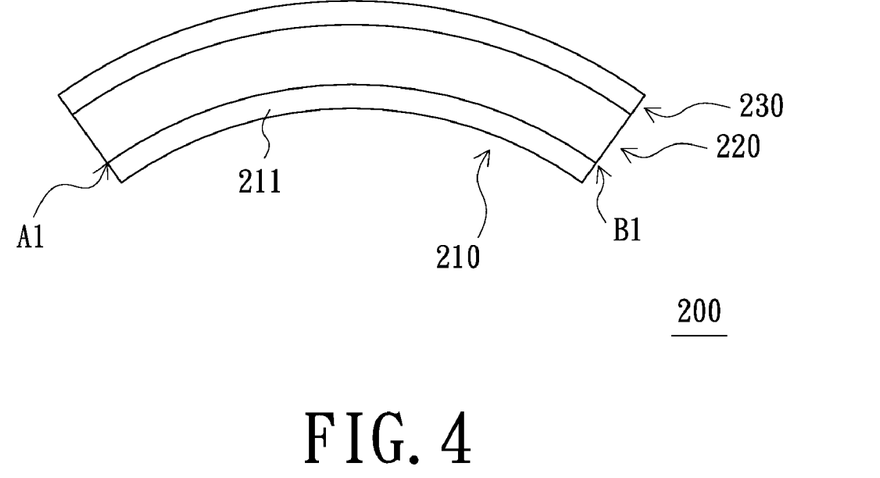
FIG. 4 is a schematic side view of the flexible display of FIG. 1 which is in a first bend state.
Figure 5:
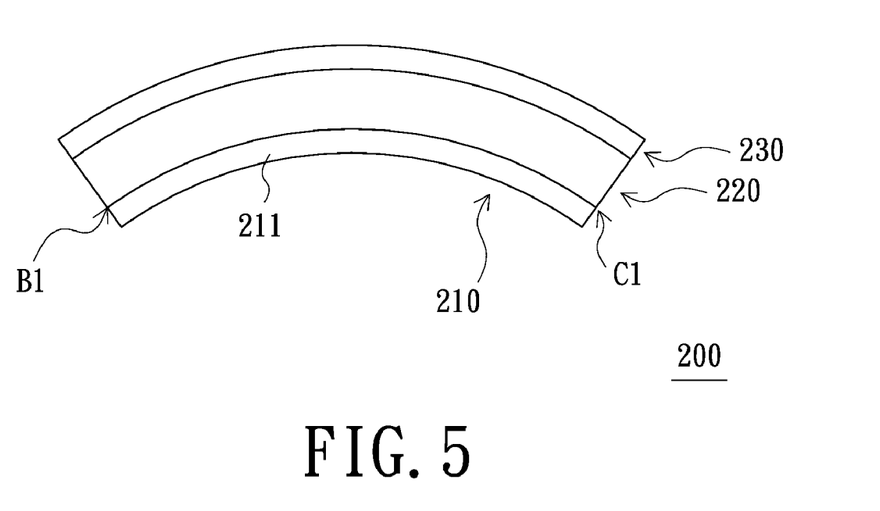
FIG. 5 is a schematic side view of the flexible display of FIG. 1 which is in a second bend state.

FIG. 4 is a schematic side view of the flexible display of FIG. 1 which is in a first bend state. FIG. 5 is a schematic side view of the flexible display of FIG. 1 which is in a second bend state. Referring to FIGS. 1-4, when the flexible display 200 is bent to be in the first bend state as shown in FIG. 4, the first current channel 212a of the first driving transistor 212 is under tension in the direction parallel to the first width W1. At this time, the first driving transistor 212 functions as a driver for driving the pixel electrode 214, and the second driving transistor 213 is idle, that is, not driving the pixel electrode 214. Since the first current channel 212a of the first driving transistor 212 is under tension in the direction parallel to the first width W1, the current flow in the first current channel 212a is increased when the first driving transistor 212 drives the pixel electrode 214. As a result, the image quality of the flexible display 200 which is bent is maintained in an acceptable state.

Referring to FIGS. 1-3 and FIG. 5, when the flexible display 200 is bent to be in the second bend state as shown in FIG. 5, the second current channel 213a of the second driving transistor 213 is under tension in the direction parallel to the second width W2. At this time, the second driving transistor 213 functions as a drive for driving the pixel electrode 214, and the first driving transistor 212 is idle, that is, not driving the pixel electrode 214. Since the second current channel 213a of the second driving transistor 213 is under tension in the direction parallel to the second width W2, the current flow in the second current channel 213a is increased when the second driving transistor 213 drives the pixel electrode 214. As a result, the image quality of the flexible display 200 which is bent is maintained in an acceptable state.

As described above, when the flexible display 200 of this embodiment is in the first bend state or the second bend state, each of the pixel electrodes 214 of the flexible display 200 can be driven by the corresponding first driving transistor 212 or the corresponding second driving transistor 213. Therefore, the image quality of the flexible display 200 which is bent can be still maintained in an acceptable state.

Second Embodiment

Figure 6:
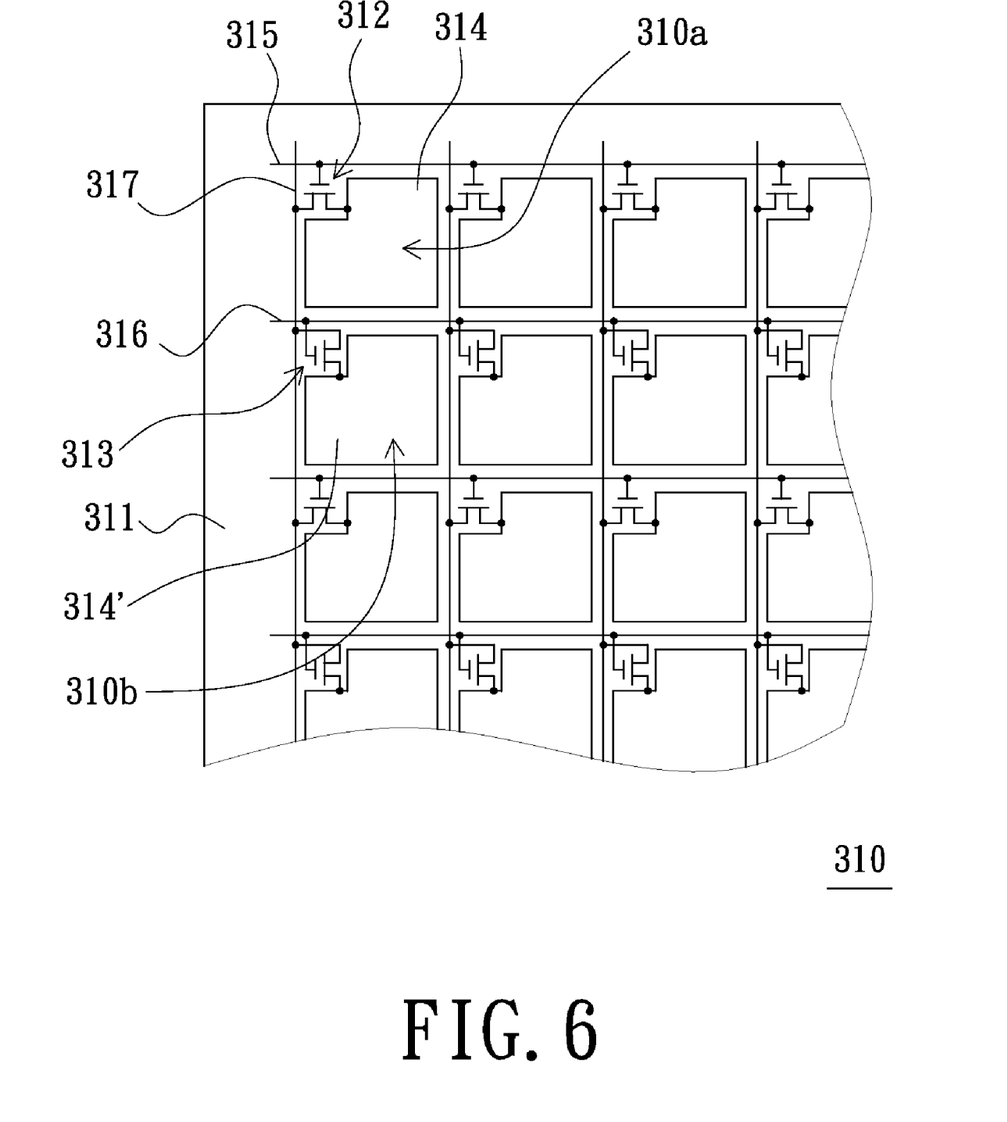
FIG. 6 is a schematic top view of a flexible pixel array substrate according to a second embodiment of the present invention.
Figure 7:
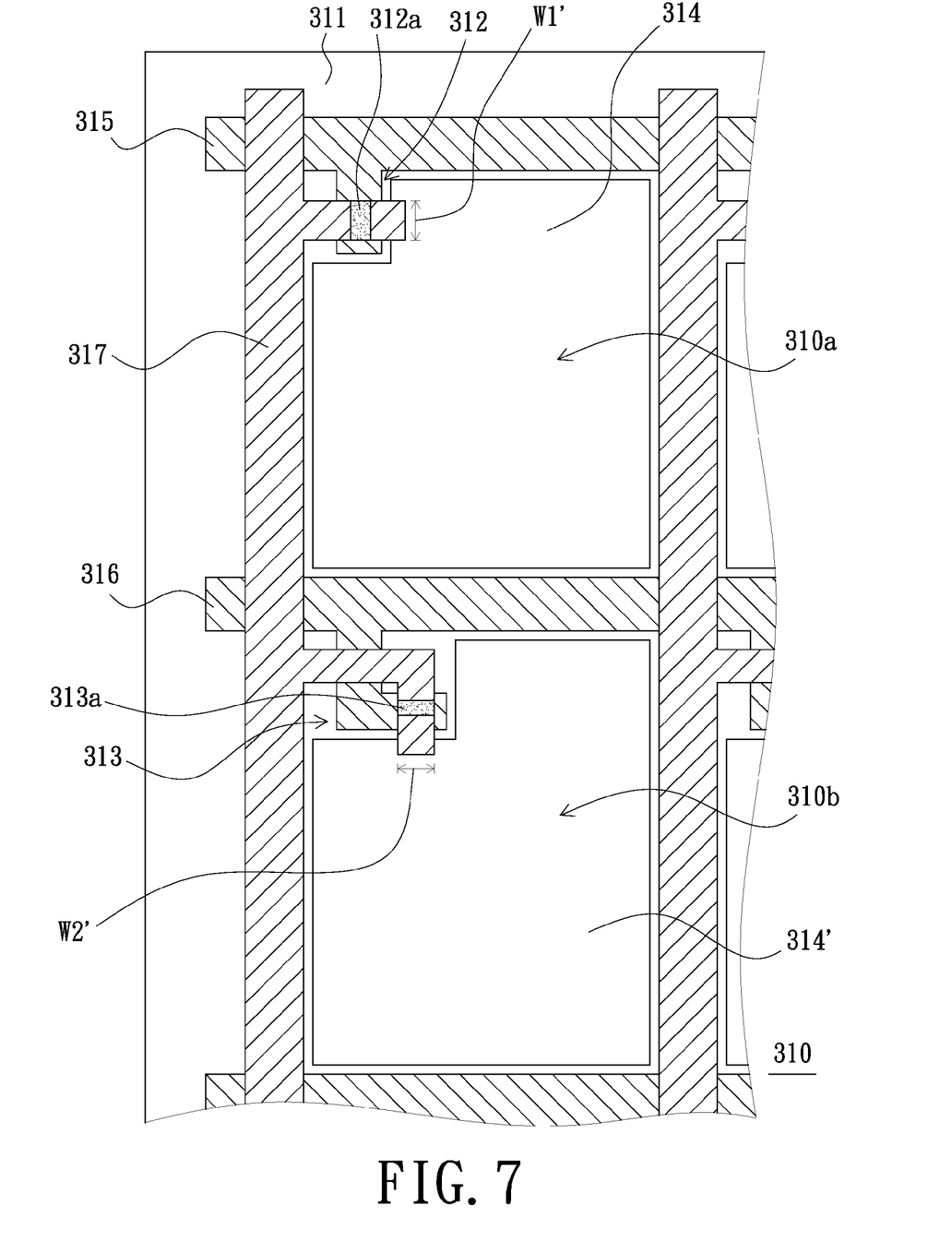
FIG. 7 is a schematic top view of the structure of one of first pixel units and the structure of one of second pixel units of FIG. 6.

FIG. 6 is a schematic top view of a flexible pixel array substrate according to a second embodiment of the present invention. FIG. 7 is a schematic top view of the structure of one of first pixel units and the structure of one of second pixel units of FIG. 6. Referring to FIGS. 6-7, the flexible pixel array substrate 310 of this embodiment includes a flexible base 311, a plurality of first driving transistors 312, a plurality of first pixel electrodes 314 which are arranged in an array, a plurality of second driving transistors 313, a plurality of second pixel electrodes 314' which are arranged in an array, a plurality of first scan lines 315, a plurality of second scan lines 316 and a plurality of data lines 317.

The flexible pixel array substrate 310 has a plurality of first pixel units 310a and a plurality of second pixel units 310b. A row of the second pixel units 310b is located between each adjacent two rows of the first pixel units 310a. Each of the first pixel units 310a is composed of one of the first pixel electrodes 314, the corresponding first driving transistor 312, one part of the corresponding data line 317 and one part of the corresponding first scan line 315. Each of the second pixel units 310b is composed of one of the second pixel electrodes 314', the corresponding second driving transistor 313, one part of the corresponding data line 317 and one part of the corresponding second scan line 316. It should be note that, for convenience of illustration, one of the first pixel units 310a and one of the second pixel units 310b are described in detail in the following text.

Referring to the first pixel unit 310a marked and the second pixel unit 310b marked in FIGS. 6-7, the first pixel electrode 314 is electrically connected to the first scan line 315 and the data line 317 via the first driving transistor 312. The second pixel electrodes 314' is electrically connected to the second scan line 316 and the data line 317 via the second driving transistor 313. A first current channel 312a of the first driving transistor 312 is not parallel to a second current channel 313a of the second driving transistor 313.

The flexible pixel array substrate 310 of this embodiment can replace the flexible pixel array substrate 210 of the first embodiment. When the flexible pixel array substrate 310 is bent so that the first current channel 312a of the first driving transistor 312 is under tension in the direction parallel to the first width W1', the first driving transistor 312 functions as a driver for driving the first pixel electrode 314, and the second driving transistor 313 functions as a driver for driving the second pixel electrode 314'. Since the first current channel 312a of the first driving transistor 312 is under tension in the direction parallel to the first width W1', the current flow in the first current channel 312a is increased when the first driving transistor 312 drives the first pixel electrode 314.

When the flexible pixel array substrate 310 is bent so that the second current channel 313a of the second driving transistor 313 is under tension in the direction parallel to the second width W2', the second driving transistor 313 functions as a driver for driving the second pixel electrode 314', and the first driving transistor 312 functions as a driver for driving the first pixel electrode 314. Since the second current channel 313a of the second driving transistor 313 is under tension in the direction parallel to the second width W2', the current flow in the second current channel 313a is increased when the second driving transistor 313 drives the second pixel electrode 314'.

Therefore, on the whole, when a flexible display (not shown) applying the flexible pixel array substrate 310 is bent, the image quality of the flexible display is still maintained in an acceptable state.

As mentioned above, the flexible pixel array substrate and the flexible display of the embodiment of the present invention have at least one of the following advantages or other advantages. When the flexible display applying the flexible pixel array substrate of the embodiment of the present invention is bent, the driving transistor of which the current in the current channel is increased drives the corresponding pixel electrode. Therefore, the image quality of the flexible display which is bent is still maintained in an acceptable state.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible pixel array substrate, comprising:
    a flexible base;
    at least one first driving transistor disposed on the flexible base and having a first current channel, the first current channel having a first width, wherein when the first current channel is under tension in the direction parallel to the first width, current flow in the first current channel is increased;
    at least one second driving transistor disposed on the flexible base and having a second current channel, wherein the first current channel is not parallel to the second current channel, the second current channel having a second width, an extending direction of the second width is not parallel to an extending direction of the first width, when the second current channel is under tension in the direction parallel to the second width, current flow in the second current channel is increased; and at least one pixel electrode disposed on the flexible base, wherein the pixel electrode is electrically connected to the first driving transistor, and the pixel electrode is electrically connected to the second driving transistor.

2. The flexible pixel array substrate as claimed in claim 1, further comprising:

at least one first scan line disposed on the flexible base;
at least one second scan line disposed on the flexible base; and
at least one data line disposed on the flexible base, wherein the pixel electrode is electrically connected to the first scan line and the data line via the first driving transistor, and the pixel electrode is electrically connected to the second scan line and the data line via the second driving transistor.

3. A flexible pixel array substrate, comprising:

a flexible base;
at least one first driving transistor disposed on the flexible base and having a first current channel, the first current channel having a first width, wherein when the first current channel is under tension in the direction parallel to the first width, current flow in the first current channel is increased;
at least one first pixel electrode disposed on the flexible base, wherein the first pixel electrode is electrically connected to the first driving transistor;
at least one second driving transistor disposed on the flexible base and having a second current channel, wherein the first current channel is not parallel to the second current channel, the second current channel having a second width, an extending direction of the second width is not parallel to an extending direction of the first width, when the second current channel is under tension in the direction parallel to the second width, current flow in the second current channel is increased; and
at least one second pixel electrode disposed on the flexible base, wherein the second pixel electrode is electrically connected to the second driving transistor.

4. The flexible pixel array substrate as claimed in claim 3, further comprising:

at least one first scan line disposed on the flexible base;
at least one second scan line disposed on the flexible base; and
at least one data line disposed on the flexible base, wherein the first pixel electrode is electrically connected to the first scan line and the data line via the first driving transistor, and the second pixel electrode is electrically connected to the second scan line and the data line via the second driving transistor.

5. A flexible display, comprising:

a flexible pixel array substrate comprising:
a flexible base;
at least one first driving transistor disposed on the flexible base and having a first current channel, the first current channel having a first width, wherein when the first current channel is under tension in the direction parallel to the first width, current flow in the first current channel is increased;
at least one second driving transistor disposed on the flexible base and having a second current channel, wherein the first current channel is not parallel to the second current channel, the second current channel having a second width, an extending direction of the second width is not parallel to an extending direction of the first width, when the second current channel is under tension in the direction parallel to the second width, current flow in the second current channel is increased; and
at least one pixel electrode disposed on the flexible base; wherein the pixel electrode is electrically connected to the first driving transistor, and the pixel electrode is electrically connected to the second driving transistor;
a display layer disposed on the flexible pixel array substrate; and
a common electrode disposed on the display layer.

6. The flexible display as claimed in claim 5, wherein the flexible pixel array substrate further comprises:

at least one first scan line disposed on the flexible base;
at least one second scan line disposed on the flexible base; and
at least one data line disposed on the flexible base, wherein the pixel electrode is electrically connected to the first scan line and the data line via the first driving transistor, and the pixel electrode is electrically connected to the second scan line and the data line via the second driving transistor.

7. A flexible display, comprising:

a flexible pixel array substrate comprising:
a flexible base;
at least one first driving transistor disposed on the flexible base and having a first current channel, the first current channel having a first width, wherein when the first current channel is under tension in the direction parallel to the first width, current flow in the first current channel is increased;
at least one first pixel electrode disposed on the flexible base, wherein the first pixel electrode is electrically connected to the first driving transistor;
at least one second driving transistor disposed on the flexible base and having a second current channel, wherein the first current channel is not parallel to the second current channel, the second current channel having a second width, an extending direction of the second width is not parallel to an extending direction of the first width, when the second current channel is under tension in the direction parallel to the second width, current flow in the second current channel is increased; and
at least one second pixel electrode disposed on the flexible base, wherein the second pixel electrode is electrically connected to the second driving transistor;
a display layer disposed on the flexible pixel array substrate; and
a common electrode disposed on the display layer.

8. The flexible display as claimed in claim 7, wherein the flexible pixel array substrate further comprises:

at least one first scan line disposed on the flexible base;
at least one second scan line disposed on the flexible base; and
at least one data line disposed on the flexible base, wherein the first pixel electrode is electrically connected to the first scan line and the data line via the first driving transistor, and the second pixel electrode is electrically connected to the second scan line and the data line via the second driving transistor.

* * * * *